(12) United States Patent
Paczkowski et al.

(10) Patent No.: US 11,997,574 B2
(45) Date of Patent: May 28, 2024

(54) SYSTEMS AND METHODS FOR A MICRO-SERVICE DATA GATEWAY

(71) Applicant: T-Mobile Innovations LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US); Carl Persson, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/733,727

(22) Filed: Apr. 29, 2022

(65) Prior Publication Data
US 2023/0353996 A1 Nov. 2, 2023

(51) Int. Cl.
*H04W 4/50* (2018.01)
*H04L 41/16* (2022.01)
*H04W 8/20* (2009.01)
*H04W 88/16* (2009.01)

(52) U.S. Cl.
CPC ............... *H04W 4/50* (2018.02); *H04L 41/16* (2013.01); *H04W 8/20* (2013.01); *H04W 88/16* (2013.01)

(58) Field of Classification Search
CPC ............ H04W 4/50; H04W 8/20; H04L 41/16
See application file for complete search history.

(56) References Cited

U.S. PATENT DOCUMENTS

| | | | |
|---|---|---|---|
| 11,419,046 B2 * | 8/2022 | Fiorese | H04L 63/108 |
| 2021/0374850 A1 * | 12/2021 | Sankaran | G06F 9/546 |
| 2022/0038554 A1 * | 2/2022 | Merwaday | H04L 45/64 |
| 2022/0225065 A1 * | 7/2022 | Doken | H04L 41/5051 |

* cited by examiner

*Primary Examiner* — Adnan M Mirza
(74) *Attorney, Agent, or Firm* — Shook, Hardy & Bacon L.L.P.

(57) ABSTRACT

Systems and methods for a micro-service data gateway are provided. In some embodiments, the micro-service data gateway comprises at least a micro-service data reflector and a micro-service data synthesizer. The data reflector operates to serve cached micro-service data in response to UE micro-service data requests. The reflector receives requests for micro-service data available from at least one data source exposed by a network exposure function (NEF) of a network operator core, retrieves the micro-service data from a data cache comprising at least a subset of micro-service data available from the data source, and provides the micro-service data to a requestor of the micro-service data. The synthesizer operates to ensure that the cache of micro-service data available to the reflector is fresh and updated. The micro-service data gateway may be positioned near the UE at a network edge of the core network and/or in part implemented within the UE.

20 Claims, 9 Drawing Sheets

SYSTEMS AND METHODS FOR A MICRO-SERVICE DATA GATEWAY

BACKGROUND

A Network Exposure Function (NEF) is a network node component of a 5G network operator core through which services offered by various internal network functions (NFs) and/or external application functions (AFs) are made available, or "exposed," for use by user equipment (UE) that utilize the 5G network operator core. The NEF essentially functions as a secure gateway, working in conjunction with the unified data repository (UDR) and policy control function (PCF) components of the network operator core, to provide UE with access to the services of the NFs and AFs (often referred to as "micro-services") in response to requests from UE that are subscribed to access those services. Moreover, applications external to the network operator core that desire to access internal data of the 5G core network will work through the NEF to obtain that internal data. Service exposure by the NEF is managed using RESTful APIs (i.e., application programming interfaces (APIs) that conform to the representational state transfer (REST) architecture). As 5G networks expand and more devices become reliant on network interactions to fully operate as designed (such as Internet-of-Things (IoT) devices, smart appliances, industrial machinery, and automated vehicles, for example), the volume of API calls to the NEF will increase at least proportionally. As an example, private networking is a growing feature of interest to enterprise consumers seeking the ability to accesses their private network's services from UE 5G networks using microservice APIs. Because the UDR and PCF are both integral components in managing the overall operation of the 5G network including uplink and downlink communications between the network core and the UE, the greater demands placed on the NEF, UDR and PCF by these micro-service APIs will not only be manifested as increased latency for access to micro-services, but in greater latency, network congestion, and strained resources for facilitating all user 5G traffic. While the potential for a more scalable NEF implemented via cloud-architectures has been proposed, such solutions do not fully address the overall strain on core network resources that will accompany the greater demand by UE for access to NF and AF provided micro-services.

SUMMARY

The present disclosure is directed, in part to micro-service data gateway systems and methods, substantially as shown and/or described in connection with at least one of the Figures, and as set forth more completely in the claims.

A Network Exposure Function (NEF) is a network node component of a network operator core through which micro-services are exposed for use in response to requests from UE coupled to the network operator core. Requests by UE for micro-service data are processed using a decentralized architecture that alleviates at least part of the burden placed on the NEF to process these services. Instead of UE based application directly interfacing with the NEF as a gateway, embodiments presented herein provide for a micro-service data gateway that provides the requested micro-service data from a cache of previously synthesized micro-service data.

In some embodiments, the micro-service data gateway comprises at least two components, which are referred to herein as a micro-service data reflector and a micro-service data synthesizer. The micro-service data reflector operates to serve cached micro-service data in response to UE micro-service requests. The micro-service data synthesizer operates to ensure that the cache of micro-service data available from the micro-service data reflector is fresh and updated. The solutions provided by the micro-service data gateway described herein reduce network congestion and consumption of processing resource within the network operating core. The network operating core benefits from greater processing and bandwidth margins, which means that the network has greater margin for supporting additional functionalities.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
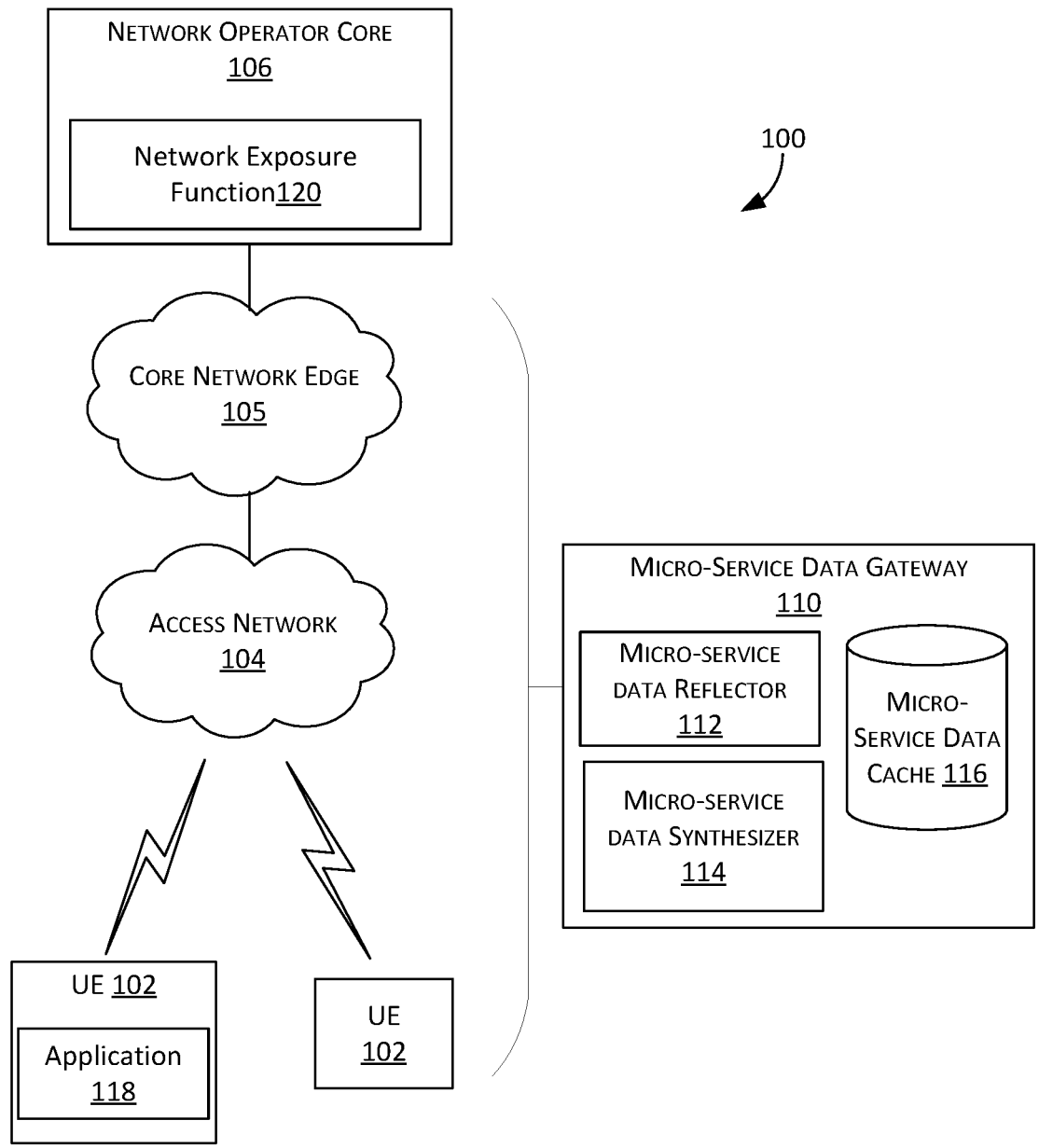
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, an expansion of the effective reach of the NEF from a centralized node of the core network to a decentralized distributed architecture. In the embodiments described herein, requests for micro-service data (which may comprise, for example, API requests) associated with NF and AF implemented micro-services are processed using a decentralized architecture that alleviates at least part of the burden placed on the network operator core to process these services. Instead of applications running on a UE directly using the NEF as a gateway for access to one or more data sources provided by exposed NF and AF micro-services, embodiments presented herein provide for a micro-service data gateway that provides the requested micro-service data. The micro-service data gateway forms a type of server-client relationship with the NEF, where the micro-service data gateway is periodically updated with micro-service data from the NEF. The micro-service data gateway caches the micro-service data that is routinely requested by the UE, and responds to UE micro-service data requests to provide that micro-service data in place of the NEF. In some embodiments, the micro-service data gateway is implemented as a micro-service API gateway that responds to UE micro-service data requests formatted as API request messages.

The NEF performs several tasks including event notification and communicating with the PCF to request a new service data flow for Quality-of-Service (QoS). The NEF can further provide information to applications at the network edge about events, and the multi-access edge computing (MEC) applications can send requests to the NEF to set up new service data flows (SDFs). Such UE micro-service data requests go to the PCF, session management function (SMF) and user plane function (UPF). These elements are single use parameters.

One or more of the embodiments for a micro-service data gateway described herein can capture and categorize these information bits, thus relieving the NEF of at least some the burden of responding to UE micro-service data requests. A micro-service data gateway can also monitor and capture specific "subscribe, unsubscribe, notify, update" service operations from a unified data management module (UDM) for future reuse in similar UE and application invocations.

Moreover, the micro-service data gateway is positioned at least in part near the UE (for example, at the core network edge of the core network), and in some embodiments is at least in part implemented within the UE. In this way, the network operator core itself is relived of much of the burden of satisfying these micro-service requests. The micro-service data gateway comprises at least two components, which are referred to herein as a micro-service data reflector and a micro-service data synthesizer. The micro-service data reflector operates to serve cached micro-service data in response to UE micro-service requests. The micro-service data synthesizer operates to ensure that the micro-service data available from the micro-service data reflector is fresh and updated at least on a periodic basis, as further explained below.

The solutions provided by the micro-service data gateway described herein reduce network congestion and consumption of processing resource within the network operating core. The network operating core benefits from greater processing and bandwidth margins, which means that the network has greater margin for supporting additional functionalities. Consumers also benefit by virtue of developers using the micro-service data gateway to bring a wider range of low latency applications that UE can implement without substantially increasing the burden on the network operator core.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

It should be understood that the UE discussed herein are in general forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, or any other smart device that at least in part operated based on micro-service data received via a network. That said, in some embodiments, UE may also include handheld personal computing devices such as cellular phones, tablets, and similar consumer equipment, or stationary desktop computing devices, workstations, servers and/or network infrastructure equipment. As such, the UE may include both mobile UE and stationary UE configured to request micro-service data from a network.

FIG. 1 is a diagram illustrating an example network environment 100 embodiment. Network environment 100 is but one example of a suitable network environment and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises a network operator core 106 (also referred to as a "Core Network") that provides one or more network services to one or more UE 102 via an access network 104, Network operator core 106 includes a network exposure function (NEF) 120, among other network functions further discussed herein. In some embodiments, network environment 100 comprises a wireless communications network.

In some embodiments, the access network 104 comprises a radio access network (RAN), often referred to as a cellular base station. The access network 104 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the access network 104 comprises a non-3GPP customer premises network, such as a local area network or intra-net comprising one or more wireless access points (APs) such as, but not limited to, IEEE 802.11 (WiFi), and/or IEEE 802.15 (Bluetooth) access points. In particular, each UE 102 communicates with the network operator core 106 via the access network 104 over one or both of uplink (UL) radio frequency (RF) signals and downlink (DL) radio frequency (RF) signals. The access network 104 may be coupled to the network operator core 106 via a core network edge 105 that comprises wired and/or wireless network connections that may themselves include wireless relays and/or repeaters. In some embodiments, the access network 104 is coupled to the network operator core 106 at least in part by the Internet or other public or private network infrastructure. Core network edge 105 comprises one or more network nodes or other elements of the network operator core 106 that define the boundary of the network operator core 106 and serves as the architectural demarcation point where the network operator core 106 connects to other networks such as, but not limited to access network 104, the Internet, or other third-party networks.

In the embodiment shown in FIG. 1, a micro-service data gateway 110 is implemented as a component of, or coupled to, the core network edge 105. In some embodiments, micro-service data gateway 110 is at least in part implemented as a component embedded with the UE 102. In the embodiments of FIG. 1, the micro-service data gateway 110 comprises a micro-service data reflector 112, a micro-service data synthesizer 114, and a micro-service data cache 116 (such as a database or other data store that caches micro-service data). In some embodiments, the micro-service data gateway 110 may be implemented by one or more processors executing instructions that cause the processor to perform those functions of the micro-service data gateway 110 (and subcomponents thereof) as described herein.

In operation, an application executing on a UE 102 (referred to herein as UE application 118) is subscribed to at least one data source comprising a micro-service of a NF or AF. In this example embodiment, the UE application 118 transmits a micro-service request to the micro-service data reflector 112 instead of using the NEF 120 as a gateway for access to one or more data sources provided by exposed NF and AF micro-services. The micro-service data reflector 112 receives that micro-service request and responds with the requested micro-service data as retrieved from the micro-service data cache 116. In some embodiments, the micro-service data reflector 112 may confirm when a UE application 118 is properly subscribed to receive the requested micro-service data based on subscription information from a policy control function of the operator core 106 (such as PCF 216 discussed below). Subscription information obtained from the PCF 216 may also be maintained in the micro-service data cache 116 and accessible to the micro-service data reflector 112 for confirming valid UE application 118 subscription to the various micro-services exposed by the NEF 120. Although network operator core 106 is illustrated as comprising a single NEF 120, it should be understood that other embodiments may comprise more than one NEF 120 and the micro-service data gateway 110 may function to cache micro-service data for those multiple NEFs.

Micro-service data in the micro-service data cache 116 is populated and maintained by the micro-service data synthesizer 114. The micro-service data synthesizer 114, at least in part, monitors requests made to the micro-service data reflector 112 to determine what micro-service data to maintain in the cache 116. That is, by knowing what micro-service data the UE 102 periodically request, and/or what micro-services the UE 102 are subscribed to, the micro-service data synthesizer 114 can discern and synthesize the relevant micro-service data for inclusion in the micro-service data cache 116. In some embodiments, the micro-service data synthesizer 114 monitors specific UE events (such as UE provisioning, for example) and captures these unique events to the cache 116.

By determining that a specific UE 102, or a given class or category of UE 102, periodically requests the same micro-service data, then that information may be synthesized by micro-service data synthesizer 114 (that is, combined into a coherent pool of micro-service data) and maintained at the core network edge 105, or otherwise maintained between the core network edge 105 and the UE application 118, in order to keep the process of responding to micro-service requests from application 118 off the other nodes of the network operate core 106. In some embodiments, the class or category of UE 102 and/or UE application 118 is included in one or more communications between the UE 102 and the micro-service data reflector 112. For example, the class or category information may indicate that the UE 102 comprises a specific type of device or used by a specific enterprise, such as an automated vehicle for example. The micro-service data synthesizer 114 may, in some embodiments, be programed to identify micro-service requests (e.g., API calls/requests) for similar micro-service data, and generate its own category information for UE 102 based on data need, and then pull that data from the NEF 120 for such UE 102 based on the categorization. In some embodiments, the micro-service data synthesizer 114 may comprise one or more artificial intelligence (AI) inference engines trained to input micro-service requests received at one or more micro-service data reflector 112, and from that input classify the sender (e.g., a UE 102 and/or UE application 118) sending the micro-service requests. In this way, the micro-service data synthesizer 114 can learn what micro-service data to save to the micro-service data cache 116 to satisfy micro-service requests without being specifically instructed what micro-service data to save. In some embodiments, the micro-service data synthesizer 114 can similarly learn about new micro-services that have been exposed by the NEF 120 (e.g. by observing micro-service requests), infer that associated micro-service data will be relevant to one or more classes or categories of UE 102 and/or UE applications 118, and request that micro-service data via the NEF 120 for storage in micro-service data cache 116 in anticipation for micro-service requests for that micro-service data.

In some embodiments, a micro-service data gateway 110 may be dedicated to synthesizing and serving micro-service data for a specifically defined class of UE 102. Client needs for micro-service data may be similar for similar devise types, and/or different for different device types. Two different brands of autonomous vehicles may access different application functions but still share a common need for micro-service data related to current network congestion or latency statistics. For example, in some embodiments, a given micro-service data gateway 110 may be dedicated to serving UE 102 that comprise vehicles, another micro-service data gateway 110 may be dedicated to serving UE 102 that comprise industrial machinery, and yet another micro-service data gateway 110 may be dedicated to serving UE 102 that comprise consumer IoT appliances. In other embodiments, a micro-service data gateway 110 may operate more as a global server of micro-service data. For example, in some embodiments a micro-service data gateway 110 may serve UE 102 within a segment of a network, regardless of the class of device or task they perform.

In some embodiments, the micro-service data synthesizer 114 monitors for changes indicated by elements the network operator core 106 network, such as changes to micro-service data or metadata, changes in available exposed micro-services, and/or for configuration changes that may trigger updating micro-service data cache 116. Information about such changes may be communicated by the NEF 120 to the micro-service data synthesizer 114 on a periodic basis (such as daily, for example). In some embodiments, the NEF 120 injects metadata to the micro-service data synthesizer 114 that identifies changes to the 5G network operator core 106 or other aspects of the 5G environment to trigger updating micro-service data cache 116. For example, in some embodiments, a network administrator may make one or more changes that affect network metadata and the micro-service data synthesizer 114 will monitor network maintenance and control channels to receive updated micro-service data for updating the micro-service data cache 116. As such, the micro-service data gateway 110 will be able to response to micro-service requests using the latest available information. Moreover, responding to micro-service request from UE 102 via proxy by the micro-service data gateway 110 facilitates topology hiding that ensures potentially malicious data/API request coming from compromised UEs are curtailed prior to the requests reaching the network operator core 106.

Core network operating efficiencies are also realized by time shifting and consolidating calls to the NEF 120. As an example, in one embodiment, and enterprise may operate a large plurality of UE 102 (a fleet of vehicles or factory of industrial machines, for example) that are deactivated at the end of a working shift, and re-activated at the start of the next day. When these UE 102 re-activate, they seek to refresh their micro-service data from one or more micro-services they subscribe to. Instead of micro-service requests from this large plurality of UE 102 all being directed to the NEF 120 at the same time, the responses to all of their micro-service requests are available from the cached pools of data in the micro-service data cache 116 which can be served by a micro-service data reflector 112. Moreover, during the period of time when these UE 102 are deactivated, the micro-service data synthesizer 114 continues to collect data for caching, either based on direct instructions from the NEF 120 or based on data gleaned from network events, prior requests from UE 102, or activities from other micro-service data synthesizers on the network, as discussed above. The micro-service data synthesizer 114 is thus ensuring that any new or updated micro service data available via the NEF 120 gets pushed to the micro-service data cache 116 during those off-shift periods. The UE application 118 doesn't need to act to trigger retrieval of the relevant data from the NEF 120 because the micro-service data synthesizer 114 has anticipated the need for the data and updated the micro-service data cache 116 accordingly.

Micro-service requests from the UE 102 are thus satisfied by the micro-service data gateway 110 without consuming processing or bandwidth resources of the network operator core 106. The solutions provided by the micro-service data gateway 110 described herein serve to reduce network congestion and consumption of processing resource within the network operating core 106, which in itself represents a technical improvement to the underlying system. The network operating core 106 thus also benefits from greater processing and bandwidth margins, which means that the network has greater margin for supporting additional functionalities since those resources are not being consumed processing micro-service requests. Consumers also benefit by virtue of developers using the micro-service data gateway 110 to bring a wider range of low latency applications that the UE 102 can take advantage of without overburdening the network operator core 106.

In the event that the micro-service data reflector 112 receives a micro-service request for data not available from the cache 116 (for example, where a new micro-service is made available), in some embodiments the micro-service data synthesizer 114 will query the NEF 120 for the data, and store the data received to the micro-service data cache 116. Alternatively, the micro-service data reflector 112 may defer and re-route that micro-service request directly to the NEF 120.

Figure 2:
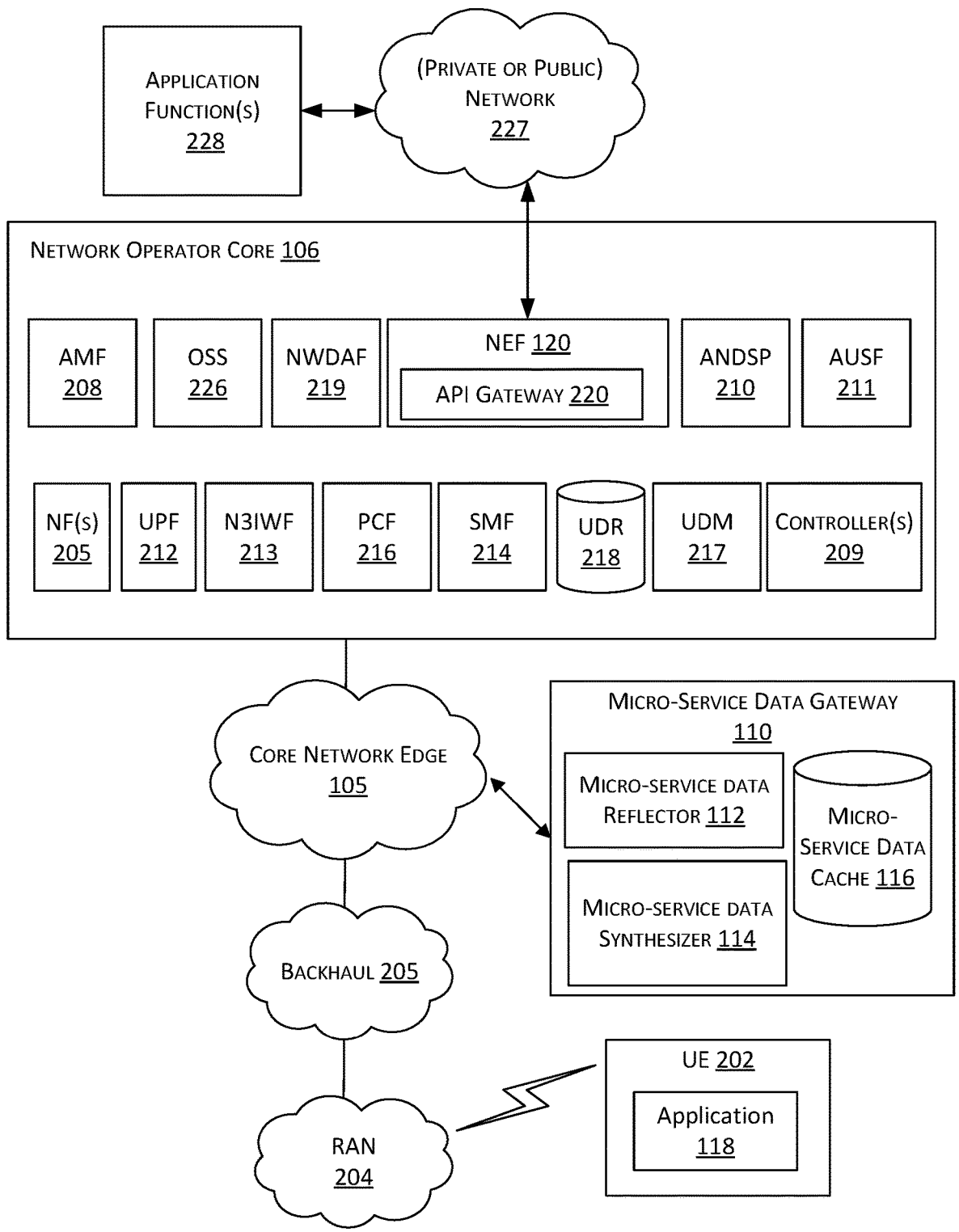
FIGS. 2, 3 and 4 are diagrams illustrating example operating environments, in accordance with some embodiments described herein.

Referring now to FIG. 2, in this example, network environment 100 is illustrated in greater detail as operating environment 200 with various implementations of the micro-service data gateway 110 illustrated. The operating environment 200 is generally configured for wirelessly connecting UE 102 to data or services that may be accessible on one or more application servers or other functions, nodes, or servers (such as services from application function(s) 228). In some implementations, the application function 228 serve as the originating server or servers for data (such as environmental data, traffic condition data, navigation and/or other operating commands) delivered to the UE 102 and utilized for operation of the UE 102.

It should be understood that in some aspects, the operating environment 200 may not comprise a distinct network operator core 106, but rather may implement one or more features of the network operator core 106 within other portions of the network, or may not implement them at all, depending on various carrier preferences. The operating environment 200, in some embodiments, is configured for wirelessly connecting UE 102 to other UE 102 or other telecommunication networks such as network 227, or a publicly-switched telecommunication network (PSTN). Generally, each UE 102 is a device capable of unidirectional or bidirectional communication with access network 104 using radio frequency (RF) waves.

Still referring to FIG. 2, in some implementations, the network operator core 106 may comprise modules, also referred to as network functions (NFs), generally represented in FIG. 2 as NF(s) 205. Such network functions may include, but are not limited to, one or more of a core access and mobility management function (AMF) 208, an access network discovery and selection policy (ANDSP) 210, an authentication server function (AUSF) 211, a user plane function (UPF) 212, non-3GPP Interworking Function (N3IWF) 213, a session management function (SMF) 214, a policy control function (PCF) 216, unified data management (UDM) 217, an unified data repository (UDR) 218, Network Data Analytics Function (NWDAF) 219, the network exposure function (NEF) 120, and an operations support system (OSS) 226. It should be understood that the micro-service data gateway 110 solutions described herein may cache micro-service data for any such network functions 205 in addition to application functions 228 residing outside of the operator trust domain.

As shown in FIG. 2, the network operator core 106 may further include API Gateway 220 through which the network operator core 106 communicates with the application functions (228) via network 227. In some embodiments, the API Gateway 220 is an element of the NEF 120. In other embodiments, the API Gateway 220 and NEF 120 are distinct nodes of the network operator core 106. Implementation of these NFs of the network operator core 106 may be executed by at least one controller 209 on which the network these one or more network functions are orchestrated or otherwise configured to execute utilizing processors and memory of the one or more controllers 109. Moreover, the NFs may be implemented as physical or virtual network functions.

As used herein, the terms "function", "unit", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Figure 4:
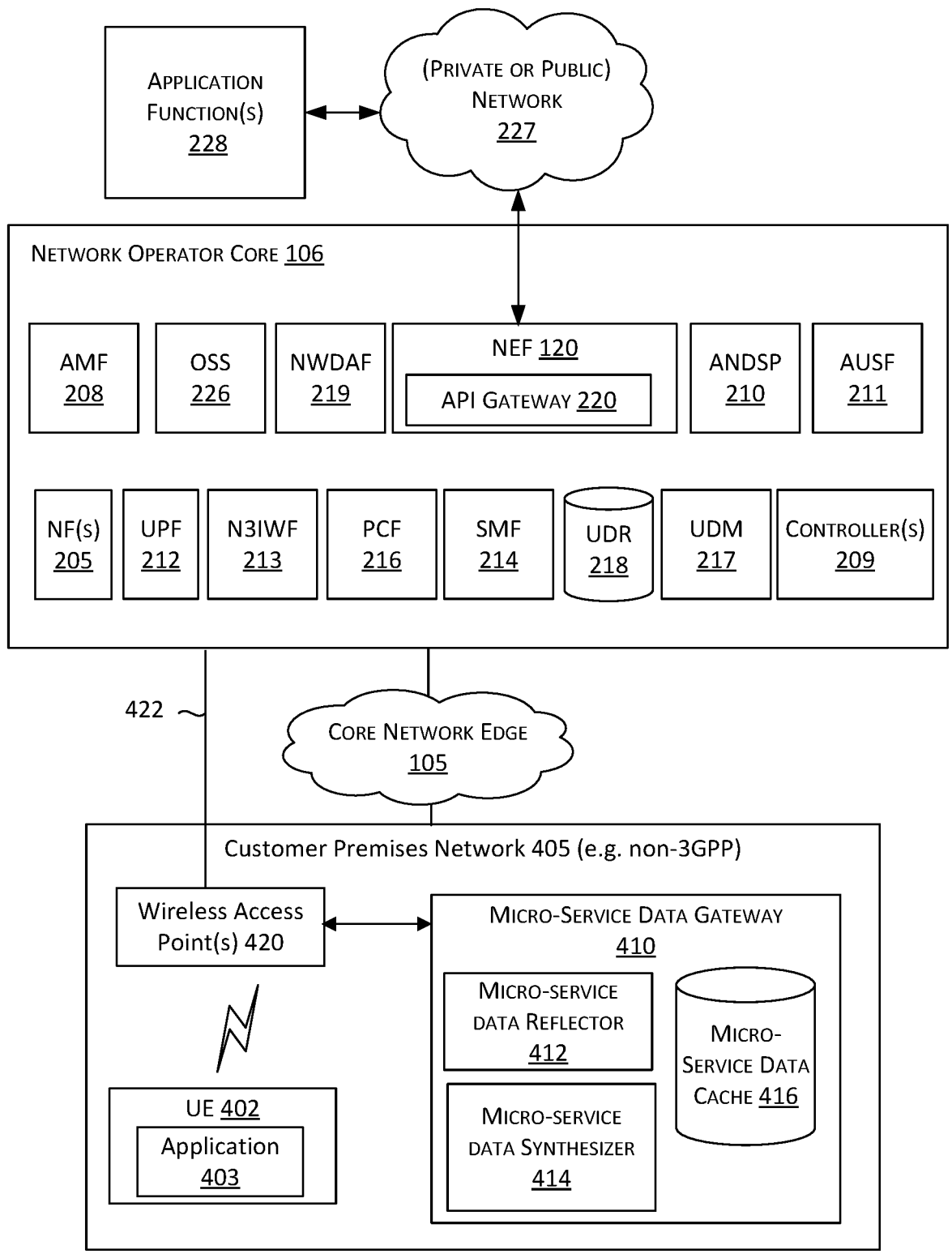

The AMF 208 facilitates mobility management, registration management, and connection management for 3GPP devices such as a UE 102. ANDSP 210 facilitates mobility management, registration management, and connection management for non-3GPP devices. A non-3GPP implementation is described in more detail with respect to FIG. 4. AUSF 211 receives authentication requests from the AMF 208 and interacts with UDM 217, for example, for SIM authentication. N3IWF 213 provides a secure gateway for non-3GPP network access, providing connections for UE accessing the network operator core 106 over a non-3GPP access network (as illustrated in FIG. 4). SMF module 214 facilitates initial creation of protocol data unit (PDU) sessions using session establishment procedures. The PCF 216 maintains and applies policy control decisions and subscription information. Additionally, in some aspects, the PCF 216 maintains quality of service (QoS) policy rules. For example, the QoS rules stored in a unified data repository can identify a set of access permissions, resource allocations, or any other QoS policy established by an operator. In some embodiments, the PCF 216 maintains subscription information indicating micro-services subscribed to by each UE 102. UDM 217 manages network user data including, but not limited to, data storage management, subscription management, policy control, and core network 106 exposure. NWDAF 219 collects data (for example, from UE, other network functions, application functions and operations, administration, and maintenance (OAM) systems) that can be used for network data analytics. The OSS 226 is responsible for the management and orchestration of the network operator core 106, and the various physical and virtual network functions, controllers, compute nodes, and other elements that implement the network operator core 106.

Some aspects of operating environment 200 comprises a unified data repository (UDR) 218 for storing information relating to access control and micro-service subscriptions. The UDR 218 is generally configured to store information relating to subscriber information and access and may be accessible by multiple different NFs in order to perform desirable functions. For example, the UDR 218 may be accessed by the AMF 208 in order to determine subscriber information, accessed by a PCF 216 to obtain policy related data, accessed by NEF 120 to obtain micro-service data that is permitted for exposure to third party applications (such as the applications 118 executed by UE 102). Such micro-service data may comprise data and/or metadata from any of the NFs and/or from one or more application functions 228 accessed via network 227. Other functions of the NEF 120 include monitoring of UE related events and posting information about those events for use by external entities, and providing an interface for provisioning UEs (via PCF 216) and reporting provisioning events to the UDR 218.

In addition to being accessible by one or more NFs, such as those described herein, the one or more NFs may also write information to the UDR 218 which may be subscribed to via micro-services by UE 102. Similar to the AMF 208, the operating environment 200 illustrates the UDR 218 according to a version of the 3GPP 5G architecture; in other network architectures, it is expressly conceived that the UDR 218 may take any desirable form of a data repository capable of being written to and accessed by one or more NFs or other functions or modules (e.g., a call session control function). The UDM 217 may facilitate communication between an NF 205, application function 228, or other module, and the UDR 218. Although depicted as a unified data management module, UDR 218 can be implemented as a plurality of network function (NF) specific data management modules.

The UPF 212 is generally configured to facilitate user plane operation relating to packet routing and forwarding, interconnection to a data network, policy enforcement, and data buffering, among others. In aspects where one or more portions of the operating environment 200 are not structured according to the 3GPP 5G architecture, the UPF 212 may take other forms, such as a serving/packet gateway (S/PGW).

Notably, the preceding nomenclature is used with respect to the 3GPP 5G architecture; in other aspects, each of the preceding functions and/or modules may take different forms, including consolidated or distributed forms that perform the same general operations. For example, the AMF 208 in the 3GPP 5G architecture is configured for various functions relating to security and access management and authorization, including registration management, connection management, paging, and mobility management; in other forms, such as a 4G architecture, the AMF 208 of FIG. 2 may take the form of a mobility management entity (MME). The network operator core 106 may be generally said to authorize rights to and facilitate access to an application server/service such as provided by application function(s) 228, requested by any of UE 102.

In the embodiment shown in FIG. 2, the access network 104 is more particularly implemented as a Radio Access Network 204, which in some embodiments may be coupled to the core network edge 105 by a backhaul network 205. In some embodiments, a UE 202 comprising a UE application 118 (such as the UE 102 of FIG. 1 comprising the UE application 118, for example) may send a micro-service request to the micro-service data reflector 112 of the micro-service data gateway 110. The micro-service data reflector 112 obtains the requested micro-service data from the micro-service data cache 116 in the same manner as discussed with respect to FIG. 1, and responds to the micro-service request from UE 202 with the requested micro-service data.

Figure 3:
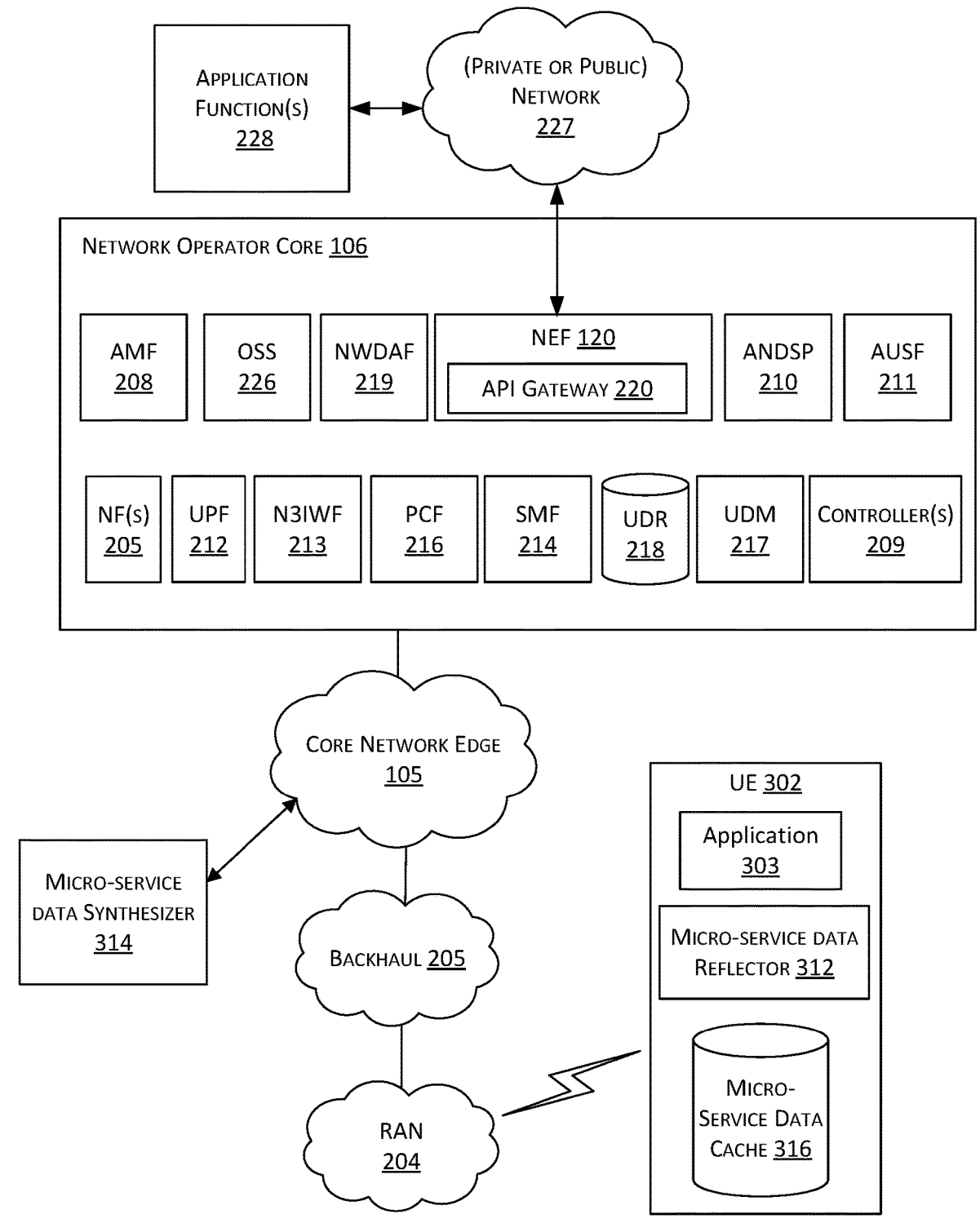

Referring now to FIG. 3, in some embodiments, a UE 302 comprising a UE application 303 (such as the UE 102 of FIG. 1 comprising the UE application 118, for example) further comprises a micro-service data reflector 312 and micro-service data cache 316 hosted at least in part directly on the UE 302. In this embodiment, a micro-service request originated by the UE application 303 is directed to the on-board micro-service data reflector 312. The micro-service data reflector 312 obtains the requested micro-service data from the micro-service data cache 316 in the same manner as discussed with respect to FIG. 1, and responds to the micro-service request from application 303 with the requested micro-service data. Advantageously, this application does not result in any traffic external to the UE 302 due to micro-service requests from application 303. In embodiments, a micro-service data synthesizer 314 within or coupled to the core network edge 105 operates in the same manner as described above with respect to micro-service data synthesizer 114 to populate and refresh micro-service data stored in the micro-service data cache 316.

Referring now to FIG. 4, an example non-3GPP implementation is illustrated. For example, there may be large number of devices (e.g., on the order of millions to billions) that may not have cellular connectivity via 5G NR or some other RAN type. In some embodiments, a UE 402 comprising a UE application 403 (such as the UE 102 of FIG. 1 comprising the UE application 118, for example) is located within a customer premises network 405 (such as a local area network, for example) comprising one or more non-3GPP wireless access points 420 (such as an IEEE 802.11 (WiFi) access point or an IEEE 802.15 (Bluetooth) access point, for example). The customer premises network 405 may be coupled to the network operator core 106 via the core network edge 105, either directly or through one or more intervening networks. In some embodiments, a non-3GPP wireless access point 420 may be coupled to the network operator core 106 via a link 422 instead of via the core network edge 105. In some embodiments, the UE 402 is wirelessly coupled to the one or more wireless access points 420 through which it communicates with the network operator core 106. However, the UE 402 may also, or instead, comprise a wired connection to the customer premises network 405 through which it communicates with the network operator core 106.

In this embodiment, a micro-service data gateway 410 functions as described with respect to the micro-service data gateway 110 of FIG. 1, but is implemented either as a dedicated device, network appliance or hub, or within a server, workstations, or other network device of the customer premises network 405. Here, the UE application 403 may send a micro-service request to the micro-service data reflector 412 of the micro-service data gateway 410. The micro-service data reflector 412 obtains the requested micro-service data from the micro-service data cache 416 in the same manner as discussed with respect to FIG. 1, and responds to the micro-service request from UE 402 with the requested micro-service data. Any number of UE 402 within the customer premises network 405 may similarly request micro-service data from the micro-service data gateway 410, thus keeping the processing and fulfillment of micro-service requests within the context of the customer premises network 405. In embodiments, micro-service data synthesizer 414 operates in the same manner as described above with respect to micro-service data synthesizer 114 to populate and refresh micro-service data stored in the micro-service data cache 416.

It should be understood that FIGS. 2, 3 and 4 are provided as illustrative examples and are not limiting. For example, other embodiments may comprise elements of FIGS. 2, 3 and 4 in combination. For example, in some embodiments, the UE 402 of FIG. 4 may send micro-service requests via wireless access point 420 and/or customer premises network 405 to a micro-service data reflector 112 of a micro-service data gateway 110 coupled the core network edge 105 as illustrated and described with respect to FIG. 2. As another example, in some embodiments, the UE 402 of FIG. 4 may itself include the micro-service data reflector 412 and micro-service data cache 416 and operate in the same way as illustrated for UE 302 in FIG. 3. In some embodiments where the application 403 of UE 402 is served micro-service data from a micro-service data gateway external to the customer premises network 405, a socket sending and receiving data between the micro-service data gateway and the application 403 may be maintained.

Figure 5:
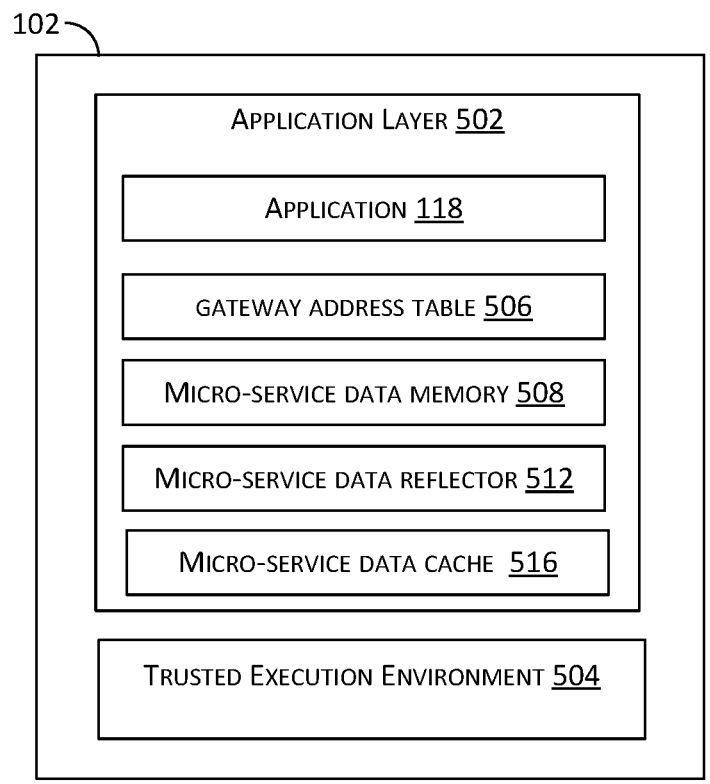
FIG. 5 is a diagram illustrating example user equipment, in accordance with some embodiments described herein.

FIG. 5 is an illustration of an example UE 102, that executes an application 118 subscribing to micro-service data via a micro-service data gateway such as described with respect to any of the embodiments presented herein. Although some UE's may include other systems, generally UE 102 includes at least an application layer 502 and may further include a trusted execution environment 504. The application layer 502 facilitates execution of the UE 102 operating system and executables (including applications such as application 118) by one or more processors or controllers of the UE 102. In other words, the application layer 502 provides a direct user interaction environment for the UE 102 and/or a platform for implementing mission specific processes relevant to the operation of the UE 102. TEE 504 facilitates a secure area of the processor(s) of UE 102. That is, TEE 504 provides an environment in the UE 102 where isolated execution and confidentiality features are enforced. Example TEEs include Arm TrustZone technology, Software Guard Extensions (SGX) technology, or similar.

As shown in FIG. 5, the application layer 502 further includes at least one API gateway address table 506 and micro-service data memory 508 that may be implemented as one or more software stacks in the application layer 502. When the application 118 generates a micro-service request, the request is generated to include an address obtained from the API gateway address table 506 for the micro-service data gateway 110. The micro-service request is then routed to the micro-service data gateway 110 based on that address. Micro-service data returned in response to the micro-service request may be saved to the micro-service data memory 508, where it is directly accessible to the application 118.

As previously discussed, in some embodiments the UE 102 may include on device instances of a micro-service data reflector (as shown at 512) and a micro-service data cache (as shown at 516) implemented by one or more software stacks of the application layer 502. In some such embodiments, the API gateway address table 506 indicates an internal address for the micro-service data gateway 110 and the micro-service request is then routed to the on-device micro-service data reflector 512 accordingly. Micro-service data reflector 512 responds in the same manner as micro-service data reflector 112 discussed herein to supply the requested micro-service data from the micro-service data cache 516 to the application 118. It should be noted that in further embodiments, an entire micro-service data gateway 110 (micro-service data reflector, micro-service data synthesizer, and micro-service data cache) can be hosted on a UE 102.

Micro-service data may include any form of data or metadata produced by network and/or application functions that is exposed by the NEF 120 of the network operator core 106. The NEF 120 exposes services and capabilities provided by the PCF 216 and specific elements of the service are captured and cached by the micro-service data gateway 110. These elements may be services related items, but also may include wireless interface elements as well. For example, the micro-service data gateway 110 may cache micro-service data such as, but not limited to: 1) Live serving cell information (such as Original Equipment Manufacturer (OEM) information, Cell identifiers/names, PLMN, Cell Sector identifiers, for example); 2) Site technology information, configuration and/or capabilities (such as, 4G/5G/LTE Advanced, Multiple-input/multiple-out (MIMO) technologies and/or configurations, backhaul network type, for example); and 3) Live candidate neighbor cell information (such as: Physical Cell ID (PCI), reference signal received power (RSRP), Reference Signal Received Quality (RSRQ), frequency bands and/or channels, E-UL-TRA Absolute Radio-Frequency Channel Number (EARFCN), for example).

Other examples of micro-service data that may be collected and cached at micro-service data gateway 110 include, but are not limited to: radio frequency (RF) service quality related data, access network, cell or base station ID information, indications of signal strength, interference, or other physical layer information, cell site id, site location, frequency band(s) and frequency bandwidth(s), 5G NCGI (NR Cell Global Identity), 4G/LTE (Long-Term Evolution) extended cell global identification (ECGI), Received Signal Strength Indicator (RSSI), Reference Signal Received Power (RSRP), Reference Signal Received Quality (RSRQ), Received Signal Signal-to-Noise Ratio (RSSNR), measured downlink (DL) speed and/or measured uplink (UL) speed, serving access network capabilities for multi-input multiple output (MIMO) and massive MIMO (mMIMO) connections, LTE-Advanced and GIG-Class, any network speed test information; utilization of carrier aggregation features, beam ID for beamforming antennas, states of connectivity (for example, whether the connection is idle, active, connecting, disconnecting) and mobility status (measurements from neighboring cells, status of handover in progress), system configurations and device capabilities, as well as alarms and faults, cell loading information, cell percent utilization, received uplink signal interference, signal-to-noise ratio (SNR), signal-to-interference noise ratio (SINR), and other RF signal quality metrics.

Unlike trusted application functions that can communicate directly with the PCF 216, when a UE 202 sends a request associated with an untrusted application function, the NEF 120 adds a layer of validation and security. In some embodiments, the micro-service data gateway 110 can track and cache micro-service data for such requests, providing an additional layer of authentication. For example, when an application 118 sends a request over an API interface to indicate the type of connectivity it is requesting to use, the NEF 120 may first authorizes the request and then translate or map the request into a format the 5G core understands. Generally, this is a use once and discard data event. In some embodiments, the micro-service data gateway 110 can capture and synthesis this information as micro-service data for future reuse.

Figure 6:
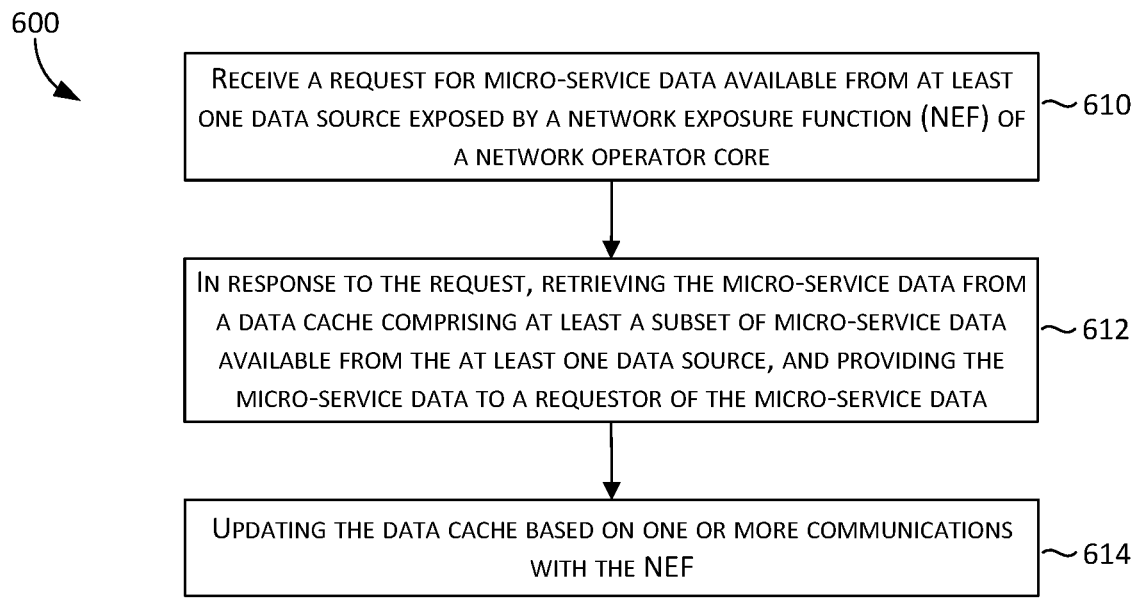
FIG. 6 is a flow chart illustrating an example method for serving micro-service data from a micro-service data gateway, in accordance with some embodiments described herein.

FIG. 6 is a flow chart illustrating a method 600 for serving micro-service data from a micro-service data gateway, according to one embodiment. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 600 are implemented utilizing a micro-service data gateway and/or network environment 100 as disclosed above.

The method 600 begins at 610 with receiving a request for micro-service data available from at least one data source exposed by a network exposure function (NEF) of a network operator core. The data sources may be provided by one or more NF and/or AF micro-services. In one embodiment, one or more UE communicate with a network operator core via an access network. The access network may be coupled to the network operator core via a core network edge that comprises wired and/or wireless network connections that may themselves include wireless relays and/or repeaters. The access network may be coupled to the network operator core at least in part by the Internet or other public or private network infrastructure. In some embodiments, the request for micro-service data is received from a UE application running on a UE that sends request to a micro-service data reflector of a micro-service data gateway instead of transmitting that request to the NEF of the network operator core. The micro-service data gateway comprises one or more network nodes that are distinct from the NEF and either on the network edge of, or external to, the network operator core. For example, the micro-service data gateway may be implemented as a component of, or coupled to, the core network edge. In some embodiments, the functions of the micro-service data gateway may be distributed. For example, the micro-service data gateway may comprise a micro-service data reflector and micro-service data cache that are at least in part implemented as components embedded with the UE.

The method 600 proceeds to 612 which includes, in response to the request, retrieving the micro-service data from a data cache comprising at least a subset of micro-service data available from the at least one data source, and providing the micro-service data to a requestor of the micro-service data. In some embodiments, the micro-service data reflector of the micro-service data gateway receives the request and responds with the requested micro-service data as retrieved from the micro-service data cache. In some embodiments, the micro-service data reflector may confirm that the UE is properly subscribed to receive the requested micro-service data. For example, subscription information available from the PCF may be used for confirming valid UE application subscription to data sources exposed by the NEF. Micro-service data in the micro-service data cache may be populated and maintained by the micro-service data synthesizer of the micro-service data gateway. The micro-service data synthesizer may be co-located with the micro-service data reflector, or implemented a node distinct from the node implementing the micro-service data reflector.

The method 600 proceeds to 614 which includes updating the data cache based on one or more communications with the NEF. As discussed in detail above, the micro-service data synthesizer can monitor requests made to the micro-service data reflector to determine what micro-service data to maintain in the data cache. By knowing what micro-service data the UE periodically request, and/or what micro-services the UE are subscribed to, the micro-service data synthesizer can discern and synthesize the relevant micro-service data for inclusion in the data cache.

By determining that a specific UE, or class or category of UE, periodically requests the same micro-service data, then that information may be synthesized by the micro-service data synthesizer (that is, combined into a coherent pool of micro-service data) and maintained at the core network edge, or otherwise maintained between the core network edge and the UE application. Method 600 thus addresses network congestion and conservation of network processing resources by keeping the process of responding to micro-service requests from UE applications separate from the operation of other nodes of the network operate core.

Figure 7:
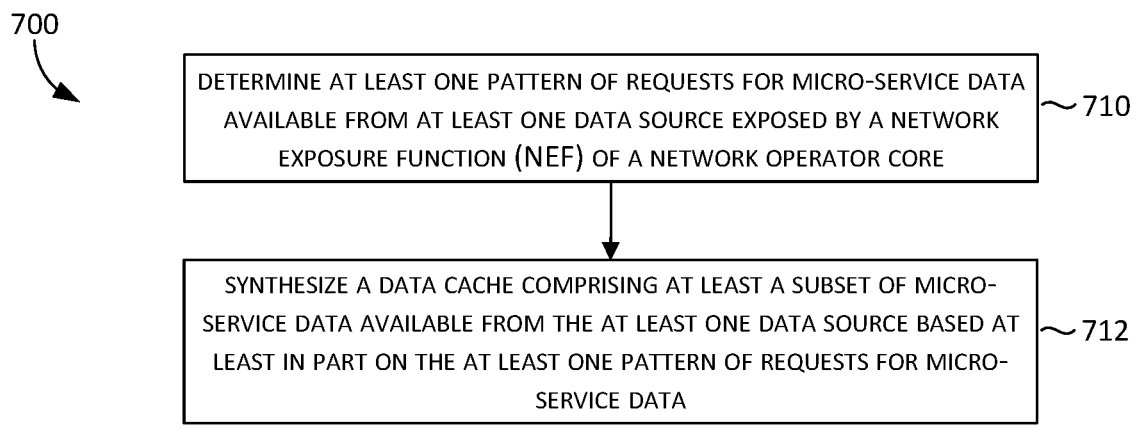
FIG. 7 is a flow chart illustrating an example method for updating a data cache of a micro-service data gateway, in accordance with some embodiments described herein.

FIG. 7 is a flow chart illustrating another method 700 for updating a data cache of a micro-service data gateway, according to one embodiment. It should be understood that the features and elements described herein with respect to the method of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figured and/or embodiments described herein and vice versa.

The method 700 of FIG. 7 includes at 710 determining at least one pattern of requests for micro-service data available from at least one data source exposed by a network exposure function (NEF) of a network operator core. As previously discussed, instead of UE applications directly communicating with the NEF as a gateway for access to one or more data sources provided by exposed NF and AF micro-services, embodiments presented herein provide for a micro-service data gateway that provides the requested micro-service data.

The micro-service data gateway comprises one or more network nodes that are distinct from the NEF and either on the network edge of, or external to, the network operator core. For example, the micro-service data gateway may be implemented as a component of, or coupled to, the core network edge.

In some embodiments, the micro-service data synthesizer monitors requests made to the micro-service data reflector to determine one or more patterns of requests for micro-service data to determine what micro-service data to maintain in the micro-service data cache. By knowing what micro-service data UE periodically request, the micro-service data synthesizer can discern and synthesize the relevant micro-service data for inclusion in the micro-service data cache.

The method 700 accordingly includes at 712 synthesizing a data cache comprising at least a subset of micro-service data available from the at least one data source based at least in part on the at least one pattern of requests for micro-service data. The micro-service data synthesizer may be programed to identify patterns of micro-service requests for similar micro-service data, and generate category information based on patterns of micro-service data requests. The micro-service data synthesizer can then requests that data from the NEF to update the data cache. In some embodiments, the micro-service data synthesizer comprises one or more AI inference engines trained to input micro-service requests, and from that input classify the UE and/or UE application sending the micro-service requests. In this way, the micro-service data synthesizer can learn what micro-service data to synthesize for inclusion in the micro-service data cache to satisfy micro-service requests without being specifically instructed what micro-service data to save. In some embodiments, the micro-service data synthesizer can similarly learn about new micro-services that have been exposed by the NEF, infer that associated micro-service data will be relevant to one or more classes or categories of UE and/or UE applications, and/or obtain that data from the data sources for storage in micro-service data cache in anticipation for micro-service requests for that micro-service data.

Figure 8:
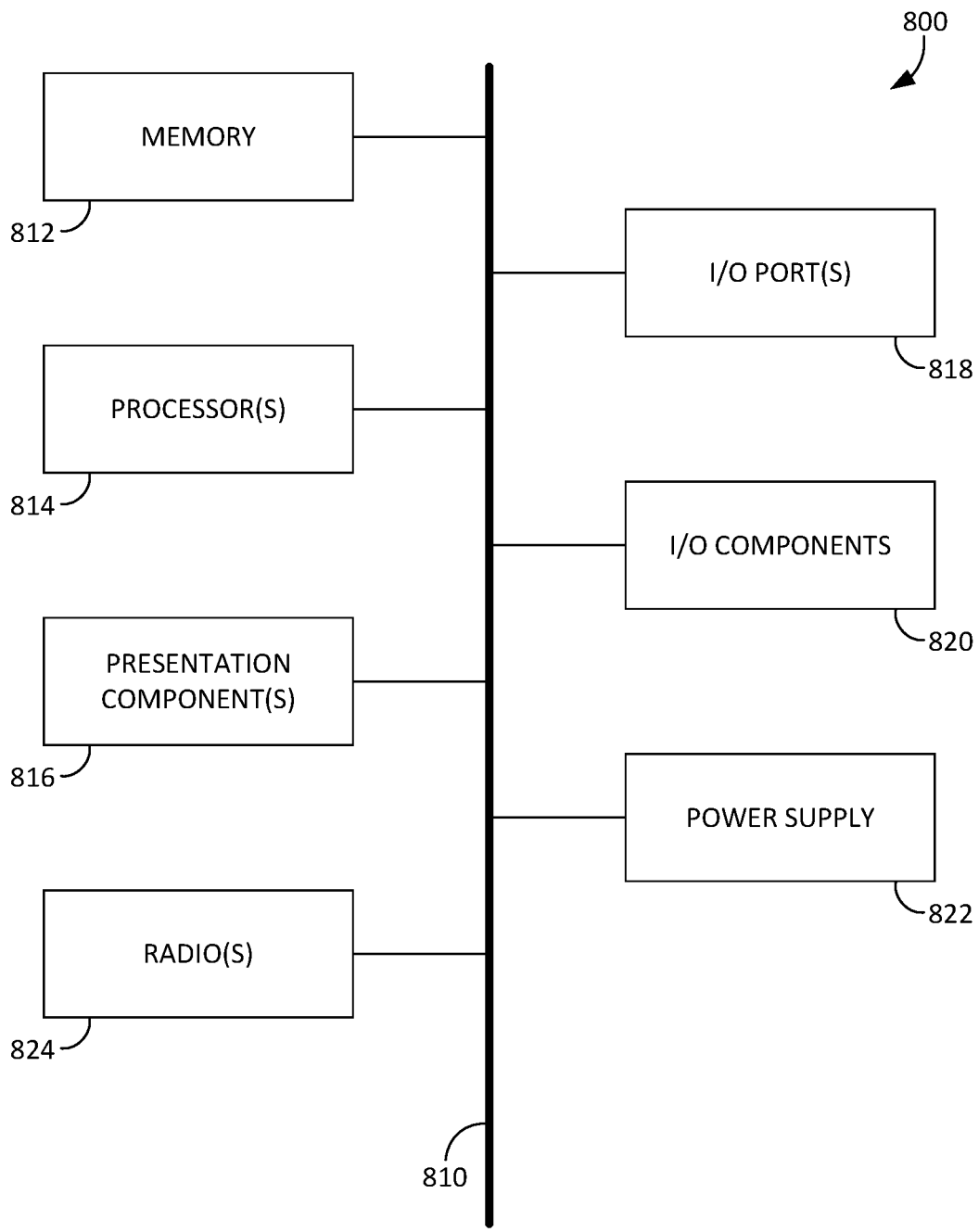
FIG. 8 is diagram illustrating an example computing environment according to an embodiment.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more busses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device." In some embodiments, the micro-service data gateway as described in any of the examples of this disclosure (such as the micro-service data gateway 110, for example) may be implemented at least in part by code executed by the one or more processors(s) 814 and in some embodiments, the micro-service data cache (such as the micro-service data cache 116, for example) implemented at least in part by memory 812.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 820. One or more presentation components 816 presents data indications to a person or other device. Exemplary one or more presentation components 816 include a display device, speaker, printing component, vibrating component, etc. I/O ports 818 allow computing device 800 to be logically coupled to other devices including I/O components 820, some of which may be built in computing device 800. Illustrative I/O components 820 include a microphone, joystick, game pad, satellite dish, scanner, printer, wireless device, etc.

Radio(s) 824 represents a radio that facilitates communication with a wireless telecommunications network. Illustrative wireless telecommunications technologies include CDMA, GPRS, TDMA, GSM, and the like. Radio 824 might additionally or alternatively facilitate other types of wireless communications including Wi-Fi, WiMAX, LTE, or other VoIP communications. As can be appreciated, in various embodiments, radio(s) 824 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 9:
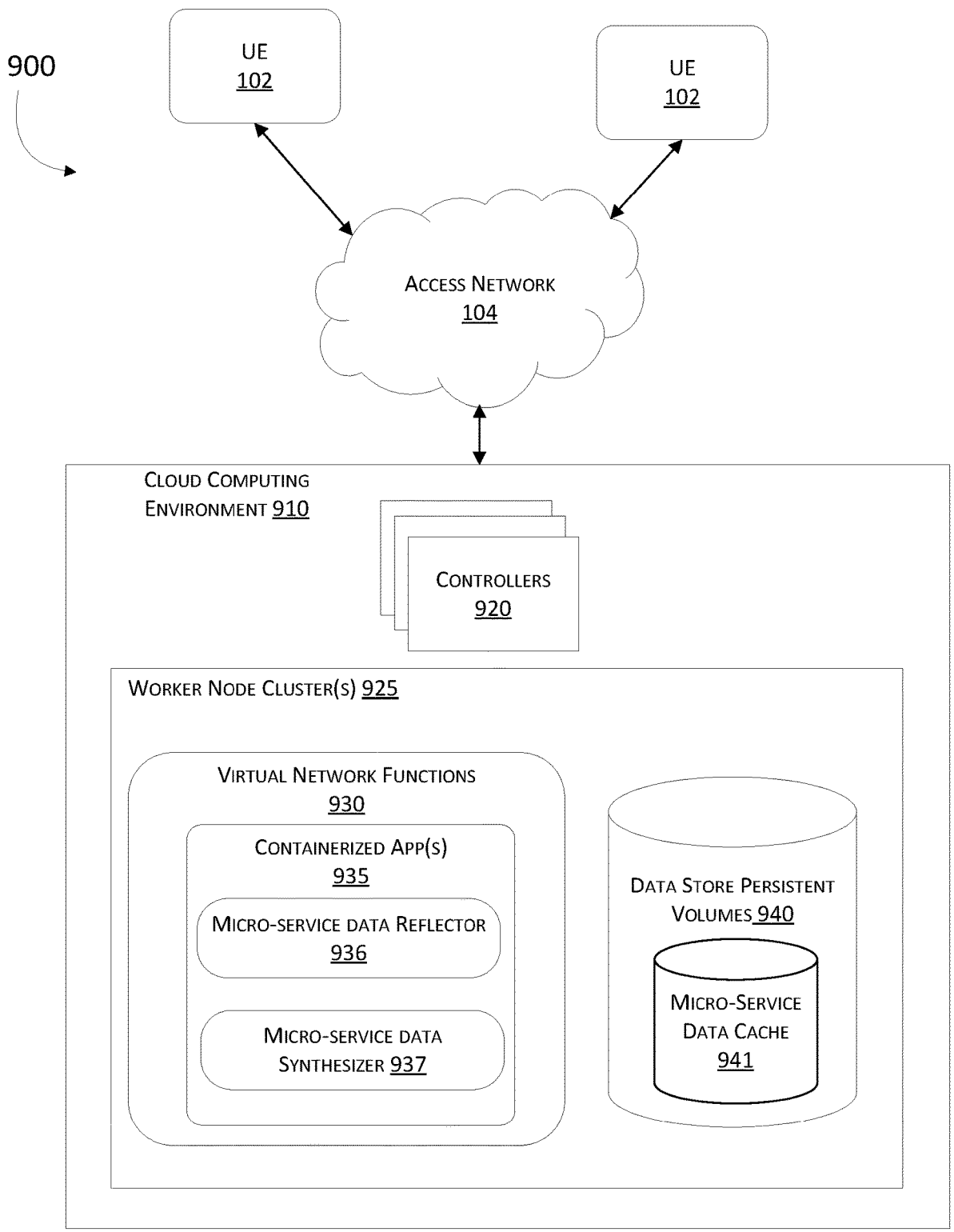
FIG. 9 is diagram illustrating an example cloud computing environment according to an embodiment.

Referring to FIG. 9, a diagram is depicted general at 900 of an exemplary cloud computing environment 910 for implementing one or more aspects of a micro-service data gateway as described in any of the examples of this disclosure (such as the micro-service data gateway 110, for example) and in some embodiments, the micro-service data cache (such as the micro-service data cache 116, for example). Cloud computing environment 910 is but one example of a suitable cloud computing environment and is not intended to suggest any limitation as to the scope of use or functionality of the embodiments presented herein. Neither should cloud computing environment 910 be interpreted as having any dependency or requirement relating to any one or combination of components illustrated. In some embodiments, the cloud computing environment 910 is executed within the core network edge 105, or otherwise coupled to the core network edge 105.

Cloud computing environment 910 includes one or more controllers 920 comprising one or more processors and memory. The controllers 920 may comprise servers of a data center. In some embodiments, the controllers 920 are programmed to execute code to implement at least one or more aspects of the micro-service data gateway, including the micro-service data reflector, micro-service data synthesizer, and/or the micro-service data cache. In some embodiments, the controllers 920 establish a cloud computing platform executing at least one or more aspects of the micro-service data gateway 110.

For example, in one embodiment the micro-service data reflector (shown at 936) and/or micro-service data synthesizer (shown at 937) are virtualized network functions (VNFs) 930 running on a worker node cluster 925 established by the controllers 920. The cluster of worker nodes 925 may include one or more orchestrated Kubernetes (K8s) pods that realize one or more containerized applications 935 for the micro-service data reflector 936 and/or micro-service data synthesizer 937. In some embodiments, the UE 102 may be coupled to the controllers 920 of the cloud computing environment 910 by access network 104. In some embodiments, a micro-service data cache (shown at 941) for the micro-service data reflector 936 may be implemented at least in part as one or more data store persistent volumes 940 in the cloud computing environment 910, the micro-service data cache 941 caching the micro-service data that is provided in response to micro-service requests received by the micro-service data reflector 936.

In various alternative embodiments, system and/or device elements, method steps, or example implementations described throughout this disclosure (such as the network operator core, application function, core network edge, access network, UE, micro-service data gateway, micro-service data reflector, micro-service data synthesizer, micro-service data cache, or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as network operator core, nodes, modules, application function, network function, core network edge, access network, user equipment (UE), gateway, data cache, and other terms derived from these words refer to the names of elements that would be understood by one skilled in the art of wireless telecommunications and related industries, and are not used herein as nonce words or nonce terms for the purpose of invoking 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for serving micro-service data over a communications network, the system comprising:
one or more processors; and
one or more non-transitory computer-readable media storing computer-usable instructions that, when executed by the one or more processors, cause the one or more processors to:
receive at a micro-service data gateway a request from a user equipment (UE) for micro-service data available from at least one data source exposed by a network exposure function (NEF) of a network operator core, wherein the micro-service gateway comprises a network node distinct from the NEF, coupled to a network edge of the network operator core between the network operator core and the UE requestor of the micro-service data; and
in response to the request, retrieve the micro-service data from a data cache comprising at least a subset of micro-service data available from the at least one data source, and provide the micro-service data to the UE requestor of the micro-service data, wherein the micro-service data gateway comprises the data cache and responds to the UE requestor to provide the micro-service data.

2. The system of claim 1, the one or more processors further to:
update the data cache based on one or more communications with the NEF.

3. The system of claim 1, the one or more processors further to:
determine at least one pattern of requests for the micro-service data available from the at least one data source exposed by the NEF; and
synthesize for the data cache the subset of micro-service data available from the at least one data source based at least in part on the at least one pattern of requests for the micro-service data.

4. The system of claim 1, wherein the micro-service data gateway comprises:
a micro-service data reflector, wherein the micro-service data is retrieved by the micro-service data reflector from the data cache based on the request; and
a micro-service data synthesizer, wherein the data cache is maintained by the micro-service data synthesizer.

5. The system of claim 4, wherein one or both of the micro-service data reflector and the micro-service data synthesizer are implemented on a network node of a network edge of the network operator core.

6. The system of claim 4, wherein one or both of the micro-service data reflector and the micro-service data synthesizer are implemented on a customer premises network coupled to the network operator core.

7. The system of claim 4, wherein one or both of the micro-service data reflector and the micro-service data synthesizer are implemented on a user equipment (UE) wirelessly coupled to the network operator core.

8. The system of claim 4, wherein the micro-service data synthesizer, to determine the micro-service data to maintain in the data cache, monitors at least one of:
one or more requests made to the NEF;
one or more requests made to the micro-service data reflector;
one or more user equipment (UE) events; and
one or more patterns of requests for the micro-service data available from the at least one data source exposed by the NEF.

9. The system of claim 1, wherein the micro-service data gateway comprises an application programming interface (API) gateway and the request comprises an API request.

10. The system of claim 1, further comprising an access network coupled to the network operator core, wherein the request is received by the micro-service data gateway from a user equipment (UE) in communication with the network operator core via the access network.

11. A method for serving micro-service data over a communications network, the method comprising:
receiving at a micro-service data gateway and from a user equipment (UE), a request for micro-service data available from at least one data source exposed by a network exposure function (NEF) of a network operator core, wherein the micro-service gateway comprises a network node distinct from the NEF, coupled to a network edge of the network operator core between the network operator core and the UE requestor of the micro-service data;
in response to the request, retrieving the micro-service data from a data cache comprising at least a subset of micro-service data available from the at least one data source, and providing the micro-service data to the UE requestor of the micro-service data, wherein the micro-service data gateway comprises the data cache and responds to the UE requestor to provide the micro-service data; and
updating the data cache based at least in part on one or more communications with the NEF.

12. The method of claim 11, further comprising:
determining at least one pattern of requests for the micro-service data available from the at least one data source exposed by the NEF; and
synthesizing the subset of micro-service data available from the at least one data source based at least in part on the at least one pattern of requests for the micro-service data.

13. The method of claim 11, further comprising:
identifying one or more patterns of micro-service data requests for similar micro-service data; and
generating category information based on the one or more patterns of the micro-service data requests for similar micro-service data.

14. The method of claim 11, further comprising:
classifying, with one or more artificial intelligence (AI) inference engines, a sender of the micro-service data requests; and
updating the data cache at least in part based on the classifying.

15. The method of claim 11, wherein the request for the micro-service data is received at a network node of a network edge of the network operator core.

16. The method of claim 11, wherein the request for the micro-service data is received at a network node of a customer premises network coupled to the network operator core.

17. A user equipment (UE) for communicating with a communication network, the communication network configured to communicate with one or more UE over one or both of uplink (UL) radio frequency (RF) signals and downlink (DL) RF signals, the user equipment comprising:

one or more processors; and one or more computer-readable media storing computer-usable instructions that, when executed by the one or more processors, cause the one or more processors to:

receive a first request from an application executed by the one or more processors, the first request for micro-service data available from at least one data source exposed by a network exposure function (NEF) of a network operator core of the communication system;

based on the first request, send a second request for the micro-service data to a micro-service data gateway comprising a data cache that includes at least a subset of micro-service data available from the at least one data source, wherein the micro-service gateway comprises a network node distinct from the NEF, coupled to a network edge of the network operator core;

receive at the UE, from the data cache of the micro-service data gateway, the micro-service data; and send to the application the micro-service data received from the micro-service data gateway in response to the second request.

18. The user equipment of claim 17, wherein the micro-service data gateway is implemented at least in part by the one or more processors.

19. The user equipment of claim 17, wherein the data cache is implemented at least in part by the user equipment.

20. The user equipment of claim 17, further comprising a gateway address table, wherein the second request for the micro-service data is forwarded to the micro-service data gateway based on the gateway address table.

\* \* \* \* \*